Jan. 2, 1934.  F. H. OWENS  1,942,067
DUAL SHUTTER CONTROL SYSTEM FOR PHOTOGRAPHIC SOUND APPARATUS
Original Filed Sept. 16, 1929
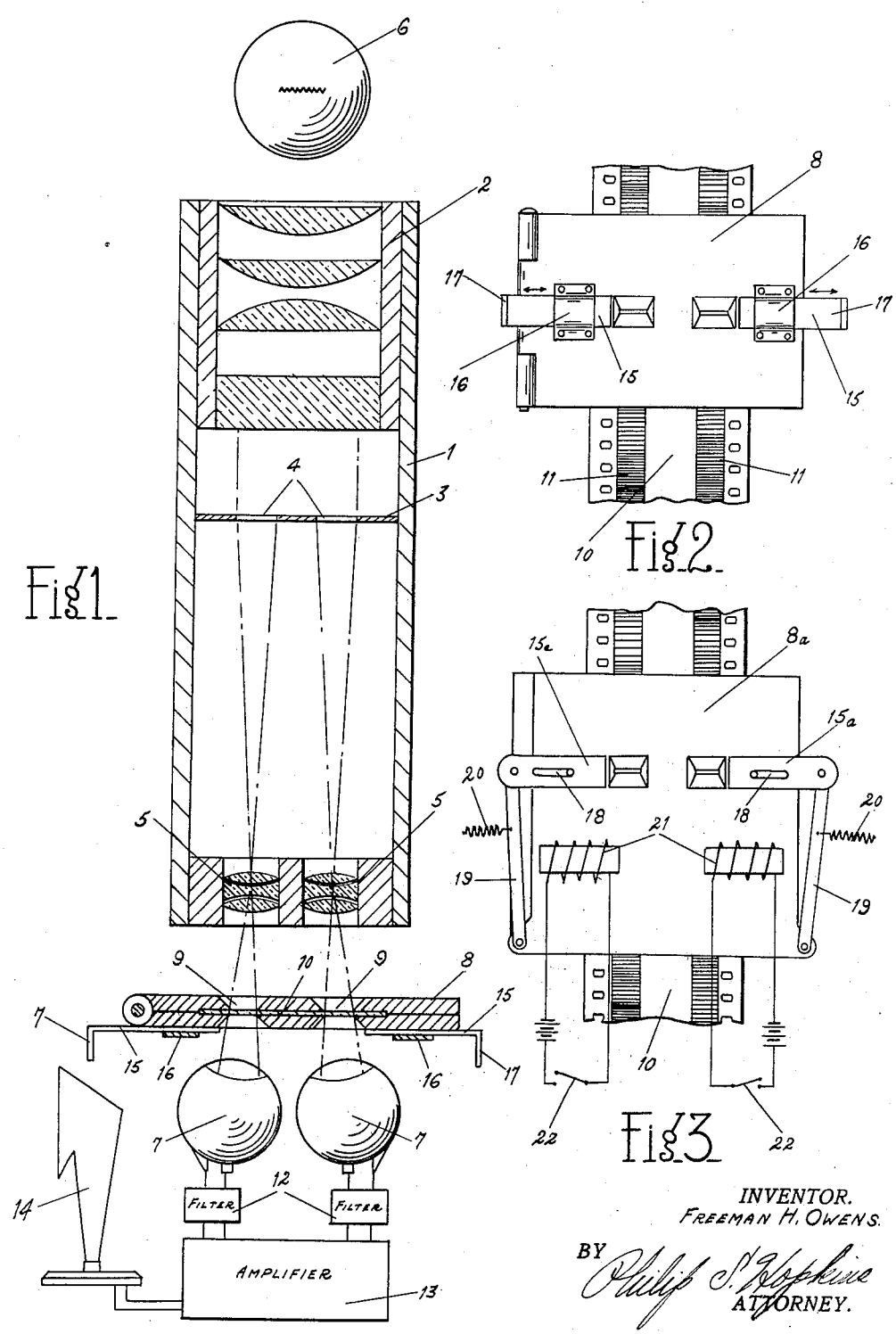
INVENTOR.
FREEMAN H. OWENS.
BY
ATTORNEY.

Patented Jan. 2, 1934

1,942,067

UNITED STATES PATENT OFFICE 1,942,067

DUAL SHUTTER CONTROL SYSTEM FOR PHOTOGRAPHIC SOUND APPARATUS

Freeman H. Owens, New York, N. Y.

Application September 16, 1929, Serial No. 393,032
Renewed May 16, 1933

3 Claims. (Cl. 179—100.3)

This invention relates to improvements in dual shutter control systems for moving picture apparatus, the principal object of the invention being to provide improved means for selectively controlling the passage of light through a traveling film at different points in the width of the film, whereby a pair of spaced sound records may be made on a single film, or a film having spaced photographic sound records thereon may have either or both of its records reproduced at will.

Other objects and advantages of the invention will appear as the description proceeds.

In the drawing accompanying this specification,

Figure 1 is a central sectional and partly diagrammatic view of an apparatus embodying the features of the present invention;

Figure 2 is a detail plan view illustrating one form of shutter mechanism described herein; and Figure 3 is a detail plan view, partly diagrammatic, of a modified form of shutter and its operating means.

Referring to the drawing, 1 designates a tubular housing in which are mounted a condenser lens system 2, a partition 3 having a pair of slits 4, and a pair of focusing lenses 5. A light 6 disposed behind the condenser lens completes the optical unit illustrated herein. This unit is intended to operate in connection with a dual system of sound recording or reproduction, that is to say, a system in which two sound records are provided on a single film, which records may be identical, or one may be a record of speech and the other a musical record or a record of any other sounds of different frequency ranges.

While for purposes of illustration the device is shown herein associated with a reproducing apparatus, it is to be understood that it is equally applicable to a recording apparatus and therefore the invention is not limited to either of said apparatus.

When the invention is used in a reproducing apparatus as illustrated herein, photo electric cells 7 are disposed in alignment with the focusing lenses 5, and between said lenses and cells is provided a gate 8 having a pair of exposure openings 9, through which gate passes a traveling film 10 having photographed thereon a pair of sound records 11 so disposed as to register with the gate openings 9 when the film is in position in the gate. The output of each photo electric cell passes through a filter 12 designed and adjusted to permit the desired frequencies to pass through to an amplifier 13 and loud speaker 14. When the device is used in a recording apparatus, the shutters should preferably be positioned between the recording light and the film.

In the apparatus so far described, the condenser lens will project light rays from the lamp 6 through the slits 4 and thus concentrate an aerial image of each of said slits on its respective focusing lens, which in turn will focus the light upon the respective sound records 11 carried by the film, the light rays so modulated being caught by the photo electric cells 7 and translated into electrical impulses which are amplified and delivered to the loud speaker in the usual manner.

In the present instance I have provided independent shutters whereby the light from either or both sound records may be shut off before it reaches its photo electric cell. The shutters shown in Figures 1 and 2 comprise manually operable members 15 which are conveniently mounted for sliding movement in brackets 16 secured on the gate 8, each of said slides being in position to cover one of the openings 9 when the slide is pushed inward or toward the companion slide, said slides being provided each with an upturned flange 17 for convenient hand manipulation.

In the form shown in Figure 3, the slides 15a are mounted on the gate 8a by pin and slot connections as indicated at 18, and are electrically operated. For this purpose a pair of links 19 are each pivoted at one end to a corner of the gate and at its opposite end to the outer end of one of the slides 15a. A coil spring 20 secured at one end to the link and at its opposite end to a fixed point, serves to maintain the shutter normally open. Each link 19 is associated with an electromagnet 21, the link being positioned so as to form an armature which is attracted toward the electromagnet when the latter is energized, whereby the shutter will be moved inward to closing position. The electromagnets and their circuits are illustrated only diagrammatically in Figure 3, each circuit including a normally open switch 22. Any suitable means may be employed for closing the circuits through the electromagnets at predetermined times, such for instance as means in contact with the edges of the picture film with which the sound film is being reproduced or recorded in synchronism, notches being formed in the edges of said picture film to permit the closing of the circuits at the desired times, in a manner similar to that shown and described in my Patent No. 1,810,324, granted June 6, 1931, on application Serial No. 371,811, filed June 18, 1929.

The device above described is particularly useful in reproducing, because by this means the light from one sound record may be cut off entirely, so that not only can the reproduction thereof be prevented while the other record is being reproduced but if for some distance on the film there is but one sound record the shutter associated with that portion of the film where there is no record can be closed and thus prevent the light passing through the film to the photo electric cell, thereby eliminating the ground noises which would be incident to such passage of light. Moreover, if the sound records happen to be identical and the volume is too great with the simultaneous reproduction of both it may be cut down by closing one of the shutters.

What is claimed is,

1. In photographic sound apparatus, an optical unit comprising a casing, a condenser lens unit therein, a partition therein having spaced narrow slits, focusing lenses in said casing in alignment with said slits, a light source adjacent said condenser unit, film supporting means in alignment with said slits and said focusing lenses, and independent shutters mounted for movement to selectively intersect the paths of light in alignment with said slits.

2. In photographic sound apparatus, an optical unit comprising a casing, a condenser lens unit therein, a partition therein having spaced narrow slits, focusing lenses in said casing in alignment with said slits, a light source adjacent said condenser unit, film supporting means in alignment with said slits and said focusing lenses, independent shutters mounted for movement to selectively intersect the paths of light in alignment with said slits, and electrical means for selectively and independently operating said shutters.

3. In photographic sound apparatus, an optical unit comprising a casing, a condenser lens unit therein, a partition therein having spaced narrow slits, focusing lenses in said casing in alignment with said slits, a light source adjacent said condenser unit, film supporting means in alignment with said slits and said focusing lenses, light sensitive elements in alignment with said film and slits, and independent shutters mounted for movement between said film and said elements for selectively and independently intersecting the light rays passing through said film.

FREEMAN H. OWENS.